J. H. LANDIS.
Meat Chopper.
No. 31,669.  Patented March 12, 1861.
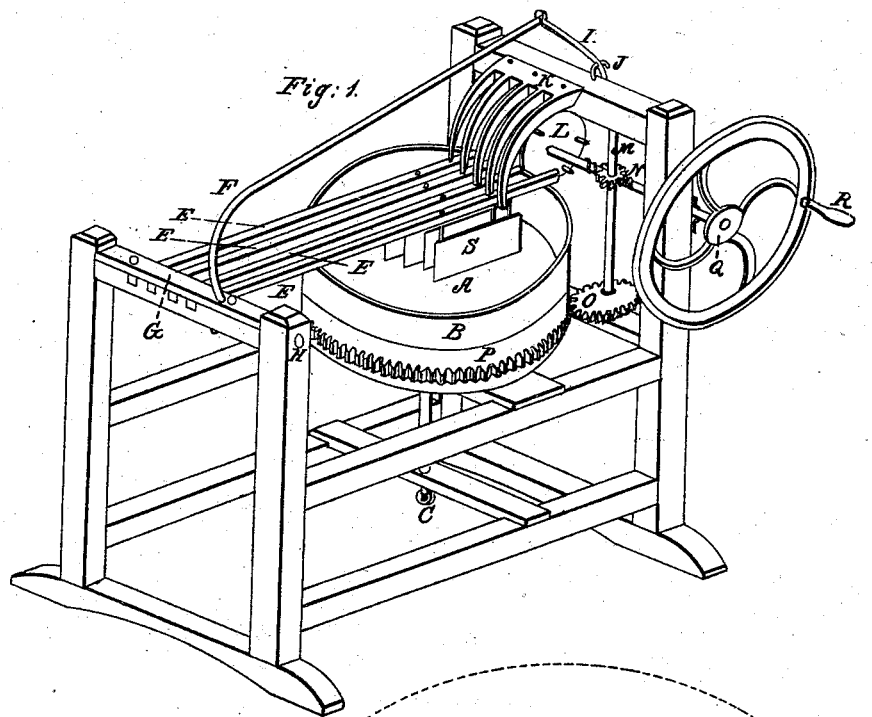
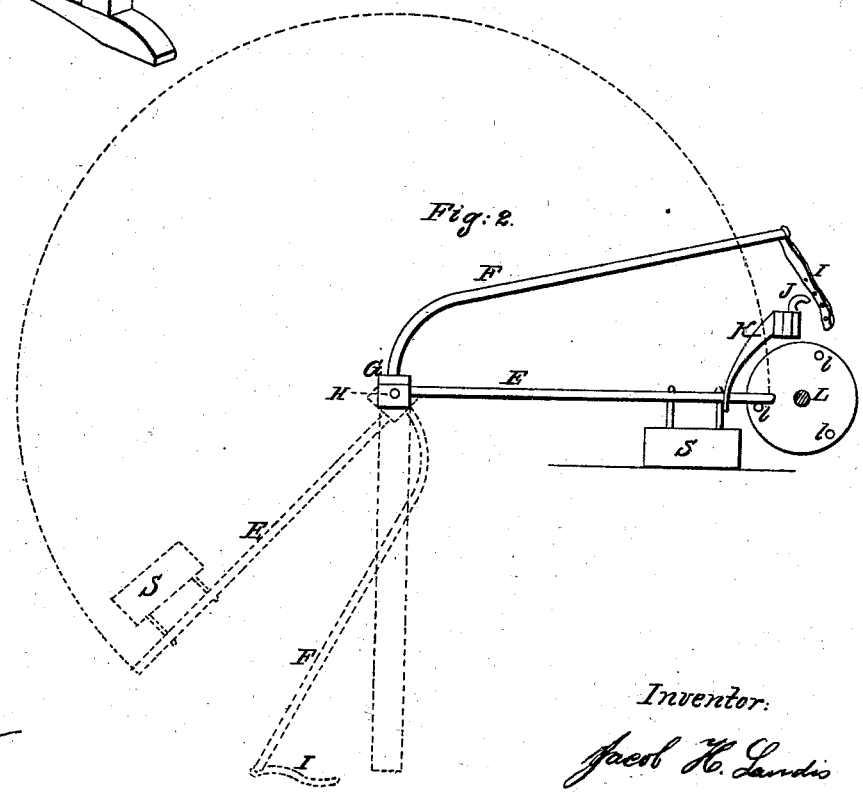
Witnesses.
S. G. Musser
Jacob Stauffer
Inventor:
Jacob H. Landis

UNITED STATES PATENT OFFICE.

JACOB H. LANDIS, OF EDEN, PENNSYLVANIA.

MEAT-CHOPPER.

Specification of Letters Patent No. 31,669, dated March 12, 1861.

*To all whom it may concern:*

Be it known that I, JACOB H. LANDIS, of Eden, in the county of Lancaster and State of Pennsylvania, have invented a new and useful Improvement in Meat-Chopping Machines; and I do hereby declare that the following is a full, clear, and exact description of the application and operation of the same, reference being had to the accompanying drawings, making a part of this specification, in which—

Figure 1 is a perspective view of its application to the ordinary revolving block A, with its ring B, and cogs P. Operated by a screw-shaft N to the fly-wheel Q (its handle R,) this shaft also supports the lifting pulleys L, and operates the pinion M on the upright shaft with its cogged wheel O, meshing into the cogs P on the block, which with the frame-work and supports are common to public use and make no part of this application.

Fig. 2 illustrates the improvement, showing one of the four or more choppers, in the revolving block G, and lever F. The dotted lines show the block G with the choppers and lever turned back from the block A for cleaning. The handles E are of elastic wood, entering mortises in the lower block, and covered with a cap C, constituting the united block G which is supported by pins or pivots between the rear uprights, and between which the block with choppers attached can be turned over out of the way.

On the top of the block G, is a bent lever rod F, extending forward with a strap I, having a series of holes by which it may be attached to the hook J, as shown. This lever operates on the rear of the elastic handles E (between the block G), in proportion as it is depressed the force of the choppers S, is increased, so that it can be regulated to any degree of force required at pleasure.

This simple device affords all the power usually imparted by means of springs separately put over each chopper or across the rear by a piece separately attached. While it admits of extensive regulation, and turning over all the choppers from the block A for cleaning each separately its utility equals the simplicity, and its durability and cheapness altogether makes it a highly desirable machine.

As before stated, I am aware that the long wooden handles, revolving block, lifters &c. are not new, nor do I claim such.

What I claim as my invention and desire to secure by Letters Patent, is—

The chopper-fulcrum G, revolving on pins H, in combination with the lever-arm F, and its strap I, and hook J, when made substantially as set forth for the purpose specified.

JACOB H. LANDIS.

Witnesses:
S. G. MUSSER,
JACOB STAUFFER.